United States Patent
Tulevski et al.

(10) Patent No.: US 7,514,063 B1
(45) Date of Patent: Apr. 7, 2009

(54) METHOD FOR THE PURIFICATION OF SEMICONDUCTING SINGLE WALLED CARBON NANOTUBES

(75) Inventors: George S Tulevski, White Plains, NY (US); Ali Afzali-Ardakani, Ossining, NY (US); Daniel P Sanders, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/028,149

(22) Filed: Feb. 8, 2008

(51) Int. Cl.
    *C01B 31/02* (2006.01)
(52) U.S. Cl. .................. 423/460; 210/638; 210/749; 209/1; 209/155; 423/461; 977/748; 977/751; 977/842; 977/845; 977/847
(58) Field of Classification Search .......... 210/638, 210/702, 729, 749; 423/265, 274, 447.1, 423/460, 461; 977/748, 751, 842, 845, 847; 428/402, 403, 407; 209/1, 155
See application file for complete search history.

(56) References Cited

U.S. PATENT DOCUMENTS

| | | | |
|---|---|---|---|
| 6,187,823 B1 * | 2/2001 | Haddon et al. ............... | 516/32 |
| 6,641,793 B2 * | 11/2003 | Haddon et al. ........... | 423/447.2 |
| 6,669,918 B2 * | 12/2003 | Schleier-Smith et al. . | 423/447.1 |
| 7,131,537 B2 | 11/2006 | Papadimitrakopoulos | |
| 7,161,107 B2 | 1/2007 | Krupke et al. | |
| 2004/0040834 A1 * | 3/2004 | Smalley et al. ............... | 204/164 |
| 2004/0232073 A1 | 11/2004 | Papadimitrakopoulos | |
| 2005/0255031 A1 | 11/2005 | Jung et al. | |
| 2006/0054555 A1 | 3/2006 | Sun | |
| 2006/0278579 A1 | 12/2006 | Choi et al. | |
| 2007/0167562 A1 * | 7/2007 | Zhou et al. .................. | 524/565 |
| 2007/0190348 A1 * | 8/2007 | Ichiki ......................... | 428/567 |
| 2008/0063587 A1 * | 3/2008 | Strano et al. ............. | 423/447.1 |
| 2008/0102213 A1 * | 5/2008 | Afzali-Ardakani et al. .. | 427/378 |
| 2008/0260616 A1 * | 10/2008 | Tour et al. ................. | 423/447.1 |

FOREIGN PATENT DOCUMENTS

| | | |
|---|---|---|
| JP | 2005104750 | 4/2005 |
| JP | 2006117498 | 5/2006 |
| JP | 2007031238 | 2/2007 |
| WO | WO2004103568 | 12/2004 |
| WO | WO2005085131 | 9/2005 |
| WO | WO2006075968 | 7/2006 |
| WO | WO2006096200 | 9/2006 |
| WO | WO2006096613 | 9/2006 |

OTHER PUBLICATIONS

Sarbajit Banerjee et al, "Covalent Surface Chemistry of Single-Walled Carbon Nanotubes", Published in Advanced Materials 2005, #17, No. 1, Jan. 6, pp. 17-29. Downloaded from the Internet on Dec. 15, 2008.*
Toyoda, Shouhei et al. Separation of semiconducting single-walled carbon nanotubes by using a long-alkyl-chain benzenediazonium compound. Chemistry—An Asian Journal, 2(1), 145-149 (English) 2007 Wiley-VCH Verlag GmbH & Co. [CA 147:200777].
Maeda, Yutaka et al. Dispersion and Separation of Small-Diameter Single-Walled Carbon Nanotubes. Journal of the American Chemical Society, 128(37) 12239-12242 (English) 2006 American Chemical Society. [CA: 145:442578].
Krupke, Ralph et al. Separation of metallic from semiconducting single-walled carbon nanotubes. Science, Jul. 18, 2003, 344-347, vol. 301.
Maeda, Yutaka et al. Large-scale separation of metallic and semiconducting single-walled carbon nanotubes. Journal of the American Chemical Society, 127(29), 10287-10290 (English) 2005 American Chemical Society. [CA: 143:239390].
An, Kay Hyeok, et al. A diameter-selective chiral separation of single-wall carbon nanotubes using nitronium ions. Journal of Electronic Materials, 35(2), 235-242 (English) 2006 Minerals, Metals & Materials Society. [CA: 145:260079].
Chen, Zhihong et al. Metallic/semiconducting nanotube separation and ultra-thin transparent nanotube films. AIP Conference Proceedings, 723(Electronic Properties of Synthetic Nanostructures), 69-74 (English) 2004 American Institute of Physics. [CA: 143: 183769].

* cited by examiner

*Primary Examiner*—Joseph W Drodge
(74) *Attorney, Agent, or Firm*—Leander F. Aulisio

(57) ABSTRACT

A method of obtaining purified semiconducting SWCNTs from a bulk mixture of metallic SWCNTs and semiconducting SWCNTs by first creating an aqueous solution containing the bulk mixture and adding a functionalized particle or nanoparticle to the solution, whereby the functionalized particle or nanoparticle reacts chemically with the metallic SWCNTs to form a high density particle-nanotube composite that can be physically separated by centrifugation.

1 Claim, No Drawings

METHOD FOR THE PURIFICATION OF SEMICONDUCTING SINGLE WALLED CARBON NANOTUBES

BACKGROUND OF THE INVENTION

Carbon nanotubes (CNTs) possess unique electrical and physical properties that make them desirable in many industrial applications. CNTs exist in two basic forms, single-walled carbon nanotubes (SWCNTs) and multi-walled carbon nanotubes (MWCNTs). As the name suggests, SWCNTs are formed from a single layer of graphene, whereas MWCNTs are formed from multiple concentric layers of graphene. The physical structure of the SWCNT renders it superior to its MWCNT counterpart in its electrical and conductive properties. This feature gives the SWCNT special importance in electronic and semiconductor applications.

SWCNTs can exist in one of three structural types, "zigzag," "armchair," or "chiral," depending on how the graphene sheet is "rolled" to form the cylindrical-shaped carbon nanotube. How the different types are formed may be understood by envisioning a single graphene sheet having a vector (n,m) defined by the integers "n" and "m" along which the sheet is rolled to form the tube, wherein "n" and "m" describe the diameter and chirality of the nanotube. If n=m, the carbon nanotube structure is referred to as an "armchair" and is characterized by its metallic properties. If m=0, the carbon nanotube is said to have a "zigzag" structure. Semiconducting carbon nanotubes have many applications including forming a thin film semiconducting coating on a substrate such as a transistor.

Conventional methods of producing single-walled carbon nanotubes (SWCNTs) include plasma arcing, carbon arc discharge, dual-pulsed laser vaporization techniques, and chemical vapor deposition. These methods typically yield a mixture of carbon nanotubes having metallic properties (m-SWCNTs) and carbon nanotubes having semiconducting properties (s-SWCNTs). For most modern applications, however, only SWCNTs with semiconducting properties are desirable. Thus, before the semi-conducting SWCNTs can be utilized they must first be separated from the metallic SWCNTs.

There exists, therefore, a need for effective and efficient separation of the metallic SWCNTs from the semiconducting SWCNTs on a bulk scale in order to obtain a purified batch of semiconducting SWCNTs. Known separation techniques include methods that rely on the innate subtle differences in density between the m-SWCNTs and the s-SWCNTs. These methods do not result in a quantitative separation and are not scalable to large quantities. Other methods rely on chemoselective electron transfer reactions that react more quickly with metallic carbon nanotubes. These methods are limited in that functionality has not been introduced to effectively separate the reacted (metallic) from the unreacted (semiconducting) CNTs.

More recently, Japanese Patent Publication No. 2007031238 (Feb. 8, 2007) discloses a method of separating metallic carbon nanotubes from semiconducting carbon nanotubes. The method comprises the steps of reacting the sodium salt of para-amino phenol with nitrosonium boron tetrafluoride to obtain a diazonium salt. The diazonium salt is then slowly added to a mixture of carbon nanotubes that have been previously dispersed in a liquid. The mixture contains both metallic and semiconducting nanotubes. The metallic nanotubes preferentially react with the diazonium salt due to higher electron density on the surface of the metallic nanotubes. The functionalized metallic nanotubes, containing as pendant groups the sodium salt of phenol, are then reacted with a functionalized particle, e.g., a particle containing halide groups on the surface thereof. The functionalized nanotubes react with the functionalized particles forming metallic carbon nanotubes coupled with particles. The metallic carbon nanotubes coupled with particles are readily removed from solution via a physical separation.

Yukata Maeda et al. disclose in the *Journal of the American Chemical Society*, 127(29), 10287-10290 (2005), a dispersion-centrifugation process in a THF solution of amine. The process allows a high concentration (up to 87%) of metallic SWCNTs to be obtained.

Kay Hyeok An et al. disclose in the *Journal of Electronic Materials*, 35(2), 235-242 (2006), a method of separating metallic single-walled carbon nanotubes from semiconducting single-walled carbon nanotubes. The method includes the steps of dispersing a powdered mixture of nanotubes in a solution of tetramethylene sulfone and chloroform, and including well dissolved nitronium ions. The dispersion is assisted by sonication. Nitronium ions are intercalated into nanotube bundles. The nitronium ions selectively attack the sidewall of the metallic SWCNT's due to the abundant presence of electron density at the Fermi level. After filtration, the semiconducting SWCNT's are left on the filter. The metallic SWCNT's are destroyed by the nitronium ions and drained away as amorphous carbons.

SUMMARY OF THE INVENTION

An embodiment of the present invention provides a method for separating metallic SWCNTs from semiconducting SWCNTs in order to obtain a purified batch of semiconducting CNTs that is more efficient than known methods, produces higher yields of the desired product and is adaptable to a large-scale operation.

One embodiment of the invention is a two-step method. In the first step, functionalized particles are added directly to an aqueous suspension containing a mixture of metallic single-walled carbon nanotubes and semiconducting single-walled carbon nanotubes. The functionalized particles react directly with the metallic single-walled carbon nanotubes to form chemically-bonded nanotube-particle composites.

The second step of the process is the physical separation of the chemically-modified metallic single-walled carbon nanotubes from the non-functionalized semiconducting carbon nanotubes. Physical separation is enabled by the high density metallic nanotube-particle composite, and may be achieved by conventional separation methods, such as centrifugation, to obtain pristine semiconducting single walled carbon nanotubes.

DETAILED DESCRIPTION OF THE INVENTION

The development of a large-scale method to effectively separate semiconducting SWCNTs from metallic SWCNTs remains a major challenge for the commercialization of SWCNT electronics. Among the obstacles that need to be overcome is the need for a separation technique that can be scaled up for commercial applications in a manner that is both efficient and effective.

An embodiment of the invention has an advantage over prior methods in that it can be easily scaled-up for commercial applications. The method provides effective separation in as few steps as possible thus achieving efficiency and higher yield.

Production of single-walled carbon nanotubes invariably results in a mixture of metallic SWCNTs and semiconducting SWCNTs. It is desirable to separate out the semiconducting SWCNTs from the metallic SWCNTs in order to obtain a purified source of semiconducting SWCNTs which can then be utilized in various industrial applications.

In the present invention, an aqueous solution comprising the mixture of metallic SWCNTs and semiconducting SWCNTs is prepared. The solution optionally comprises a surfactant, which is preferably a member selected from the group consisting of sodium cholate and sodium dodecylsulfate, although any other effective surfactant can be employed. Functionalized particles are slowly added to the solution containing the mixture. The particles can have a diameter up to about 1 mm. In a preferred embodiment, the particles are nanoparticles having a diameter in the range of about 10 nanometers to about 1000 nanometers. The finite electron density of the metallic SWCNTs results in faster electron transfer and thus faster reactivity with the functionalized particles than the semiconducting SWCNTs. The reaction between the functionalized particles and the metallic SWCNTs is a chemical reaction that results in a bond forming between the functional group of the particle and the metallic carbon nanotube.

Various functional groups can be employed, as long as the group has the ability to form a chemical bond with a pristine m-SWCNT. Bonding of the particle preferentially occurs on the sidewall of the metallic SWCNT. The bond formed between the particle and the metallic carbon nanotube can be covalent or ionic, depending on the functionality of the particle employed. It is possible for more than one functionalized particle to react with a single metallic SWCNTs.

The chemical reaction results in a nanotube-particle chemically bonded composite being formed. The chemically bonded composite can then be readily removed as by centrifugation to obtain purified semiconducting single-walled carbon nanotubes. In a preferred embodiment, the centrifuge is operated at a relatively slow speed. The speed of the centrifuge is about 1000 rpm to about 3000 rpm.

In a preferred embodiment, the steps of adding the functionalized particle to the aqueous suspension, reacting the functionalized particles with the metallic single-walled nanotubes to obtain a nanotube/particle composite, and removing the composite by a physical separation means such as centrifugation, can be repeated multiple times until desired purity of semiconducting carbon single-walled nanotubes is obtained.

A preferred functionality for the nanoparticle is an aryl diazonium salt moiety. Other moieties include carboxylic acid groups and amine groups. In a preferred embodiment, the other moieties are aryl carboxylic acids and aryl amines. Attachment of the functional group to the particle depends upon the type of particle. In a preferred embodiment, the particle is an aluminum oxide nanoparticle. The nanoparticle can be a metal, a metal oxide or a mixed metal oxide. It is within the scope of the present invention to utilize polymeric nanoparticles. If a gold nanoparticle is utilized, a functional group containing a thiol moiety in addition to an amino functionality, for example, is preferable. The thiol moiety reacts with the surface of the gold nanoparticle. The pendant amino functionality can then be derivatized to obtain a diazonium salt functionality attached to the gold particle.

During reaction of the functionalized nanoparticle with the metallic SWCNT's, the reaction is monitored by UV absorption spectroscopy. The reaction is allowed to proceed until the metallic region is completely attenuated.

In an additional embodiment of the invention, the functionalized particles can be purified, packaged and stored or marketed as a reagent for use in the separation of bulk nanotubes.

EXAMPLE

About five grams of aluminum oxide nanoparticles are obtained, the nanoparticles having a diameter of about 100 to about 500 nanometers. The aluminum oxide nanoparticles are added to a suitable solvent and functionalized by reacting the nanoparticles with about ten grams of a phosphonic acid compound (the para-amine of benzene phosphonic acid) The phosphonic acid group readily reacts with the surface hydroxyl groups of the alumina nanoparticles. After the reaction is completed, the nanoparticles, now functionalized with an aryl amino group, are removed from the reaction mixture and dried. It is believed that the surface of each nanoparticle is substantially completely covered by the aryl amino groups.

The aryl amino functionalized particles are then reacted with nitrosonium tetrafluoro borate to obtain the nanoparticles functionalized with the aryl diazonium salt (tetrafluoro borate salt).

A suspension of single walled carbon nanotubes (SWCNTS) in an aqueous medium is obtained. The SWCNTs are a mixture of metallic SWCNTs and semiconducting SWCNTs. A sodium cholate surfactant is employed to keep the nanotubes in suspension. The aqueous suspension contains about one gram of SWCNTs.

As the suspension of SWCNTs is stirred, the functionalized alumina nanoparticles are slowly metered into the aqueous suspension. The reaction is monitored by UV absorption spectroscopy. The reaction is allowed to proceed until the metallic region is completely attenuated. Nitrogen gas is given off, and a covalent bond forms between the para-carbon atom of the aryl group and a carbon atom on the metallic SWCNT. It is believed that many covalent bonds are formed with a single nanoparticle to yield a plurality of metallic carbon nanotubes attached to a single nanoparticle. It is believed that about five to about ten nanotubes can be attached to a single nanoparticle.

After the reaction is complete, the reaction mixture is removed to a centrifuge for separation of the metallic carbon nanotubes from the suspension. The centrifuge is operated at about 2000 rpm. Metallic SWCNTs, having attached thereto the alumina nanoparticles, are readily removed by centrifugation. The purified semiconducting SWCNTs are now ready for further processing.

While the invention has been describe by specific examples and embodiments, there is no intent to limit the scope of the invention except as set forth in the following claims.

We claim:

1. A method for separating a pristine semiconducting single-walled carbon nanotube from a mixture of a pristine metallic single-walled carbon nanotube and a pristine semiconducting single-walled carbon nanotube, the method consisting essentially of:
    (a) obtaining an aqueous mixture of a pristine metallic single-walled carbon nanotube and a pristine semiconducting single-walled carbon nanotube, and, optionally, a surfactant;
    (b) adding a functionalized polymeric, metal, metal oxide or mixed metal oxide particle to the aqueous mixture; whereby the particle is functionalized with a moiety selected from the group consisting of an aryl diazonium salt, an aryl carboxylic acid and aryl amine;
    (c) reacting the functionalized particle with the pristine metallic single-walled carbon nanotube to obtain a chemically bonded composite comprising the pristine metallic single-walled carbon nanotube and the functionalized water insoluble particle; and
    (d) separating the chemically bonded composite from the pristine semiconducting single-walled carbon nanotube to obtain a purified pristine semiconducting single-walled carbon nanotube.

* * * * *